May 8, 1962 H. P. KEIL 3,033,110
FEED TRAY-CONTROL ATTACHMENT FOR DUPLICATING MACHINES
Filed Sept. 22, 1961 10 Sheets-Sheet 1

Fig. 1

INVENTOR.
Henry P. Keil
BY Wells & St. John
Attys.

May 8, 1962    H. P. KEIL    3,033,110
FEED TRAY-CONTROL ATTACHMENT FOR DUPLICATING MACHINES
Filed Sept. 22, 1961    10 Sheets-Sheet 3

INVENTOR.
Henry P. Keil
BY Wells & St. John
Attys.

May 8, 1962 H. P. KEIL 3,033,110
FEED TRAY-CONTROL ATTACHMENT FOR DUPLICATING MACHINES
Filed Sept. 22, 1961 10 Sheets-Sheet 8

Fig. 13

INVENTOR.
Henry P. Keil
BY *Wells & St.John*
Attys.

May 8, 1962 H. P. KEIL 3,033,110
FEED TRAY-CONTROL ATTACHMENT FOR DUPLICATING MACHINES
Filed Sept. 22, 1961 10 Sheets-Sheet 9

Fig. 14

INVENTOR.
Henry P. Keil
BY *Wells & St. John*
Attys.

May 8, 1962  H. P. KEIL  3,033,110
FEED TRAY-CONTROL ATTACHMENT FOR DUPLICATING MACHINES
Filed Sept. 22, 1961  10 Sheets-Sheet 10

Fig.15

INVENTOR.
Henry P. Keil
BY Wills & St.John
Attys.

United States Patent Office 3,033,110
Patented May 8, 1962

3,033,110
FEED TRAY-CONTROL ATTACHMENT FOR DUPLICATING MACHINES
Henry P. Keil, Chicago, Ill., assignor to Fixture Hardware Corporation, Chicago, Ill., a corporation of Illinois
Filed Sept. 22, 1961, Ser. No. 140,055
7 Claims. (Cl. 101—232)

My present invention relates to feed tray-control attachment for duplicating machines.

In the use of power operated duplicating machines it is desirable to have the advantages of either continuous operation of the machine to make a long run of copies or one copy at a time operation when desired. This is particularly true in the use of so called "systems machines" where by the use of blackout sheets and specially printed forms, one master having all of the information desired for any copy can be used to make copies of parts of the information on the master sheet for different departments. For example, one may want to have one or two copies for a parts department that will furnish only the parts necessary to assemble a certain part of the order. The accounting department may want only a few copies of other parts of the information of the master sheet for billing purposes and the shipping department may want a few copies having only the shipping information.

It is the purpose of my invention to provide a novel arrangement of parts whereby a machine normally operable to make a continuous run of many copies is converted by addition of an auxiliary copy sheet feed tray to a one copy at a time operation, the machine being made to complete one cycle and produce one copy on a sheet fed from the auxiliary feed tray by pressing down on the auxiliary tray. With this device auxiliary trays having the necessary blocked out pre-printed copy sheets can be provided for the different departments and the operator is relieved of the burden of removing sheets from the tray and inserting different copy sheets and making the necessary side guide, etc. adjustments.

The nature and advantages of my invention will appear more fully from the following description and the accompanying drawings illustrating a preferred form of the invention. The drawings and description are illustrative only, however, and are not intended to limit the invention in scope except insofar as it is limited by the claims.

Referring now to the drawings, my invention is shown as applied to a duplicating machine which is powered by an electric motor, the general construction of the machine being substantially like that shown in my prior application, Ser. No. 20,931, filed April 8, 1960, for Operating Control Mechanism for Duplicatnig Machines. Such machines embody a drum 10 having means 11 thereon to clamp a master sheet thereto. A platen roller 12 is adapted to press copy sheets against the master sheet on the drum 10 and to rotate the drum. A drive motor 13 is operatively connected to the platen roller 12 to drive it. A pair of combined moistening and feeding rollers 14 and 15 are operable to feed copy sheet between the platen roller 12 and the drum 10. Means, including a fountain 16 and rollers 17 and 18 are provided to moisten the upper roller 14. A drive connection 19 between the platen roller 12 and the lower roller 15 of the combined feeding and moistening rollers is operable to intermittently rotate the lower roller 15. A copy sheet feeding mechanism including parts 20—25, driven by the drum 10, is operable intermittently to advance the top sheet on a feed tray 26 to the feeding and moistening rollers 14—15, all as shown and described more fully in my application identified above.

Figure 15:
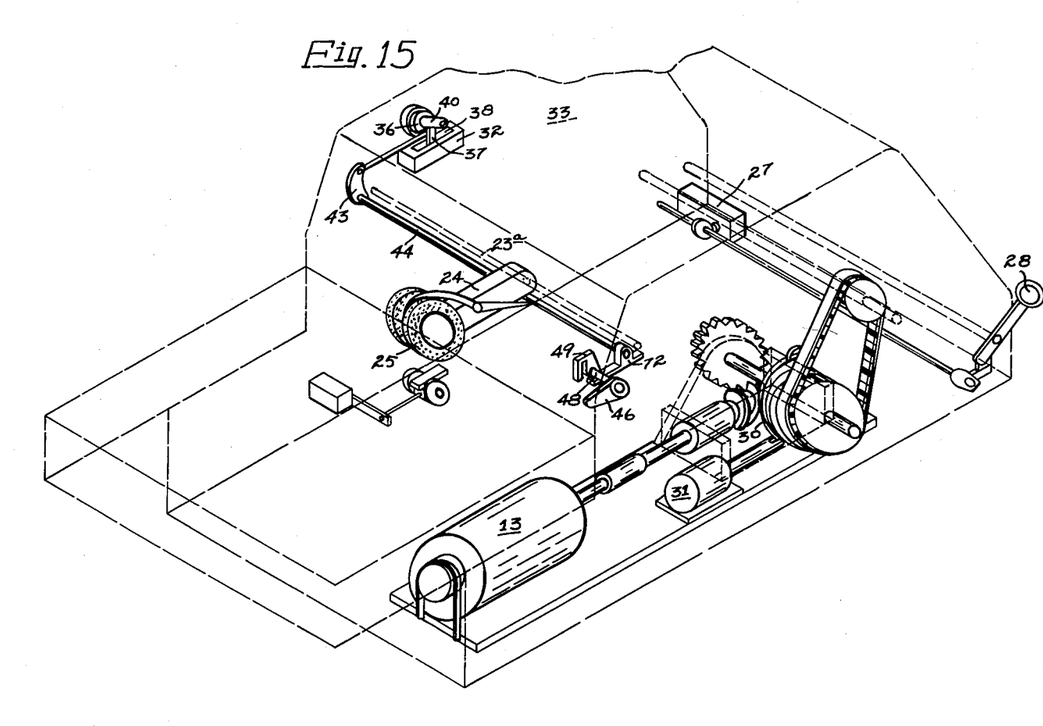
FIGURE 15 is a phantom perspective view of the entire control system of the machine with the basic parts of the machine structure shown in dashed lines.

As described in my prior application and as illustrated in the phantom perspective view, FIGURE 15, the motor 13 is controlled by a microswitch 27, activated by the major control lever 28. The microswitch 27 is closed when the lever 28 is moved down to bring the platen roller 12 up against the drum 10 and to bring the lower roller 15 up against the moistened roller 14.

Connection of the motor to the platen roller is controlled by a clutch 30 which is opened and closed by a solenoid 31. The solenoid 31 is under the control of another microswitch 32 which is mounted on one side frame 33 of the machine adjacent to the end of the fountain 16. Above the switch 32 there is a cross shaft 35 that is rotatably mounted in bosses provided in the side frames 33 and 34 of the machine. This cross shaft carries gear 21 of the sheet feeding mechanism. A cam 36 on the shaft 35 rides on a projection 37 of a switch lever 38. The cam 36 has a flat portion 36a which when faced down, allows the switch lever 38 to rise and thus break the circuit to the solenoid 31. An arm 40 is pivoted on the shaft 35 and extends downwardly and toward the drum. This arm carries a roller 41 that engages the switch lever 38. By moving the arm 40 to the left from the position shown in FIGURE 4, it can be made to depress the lever 38 and close the microswitch 32.

Figure 4:
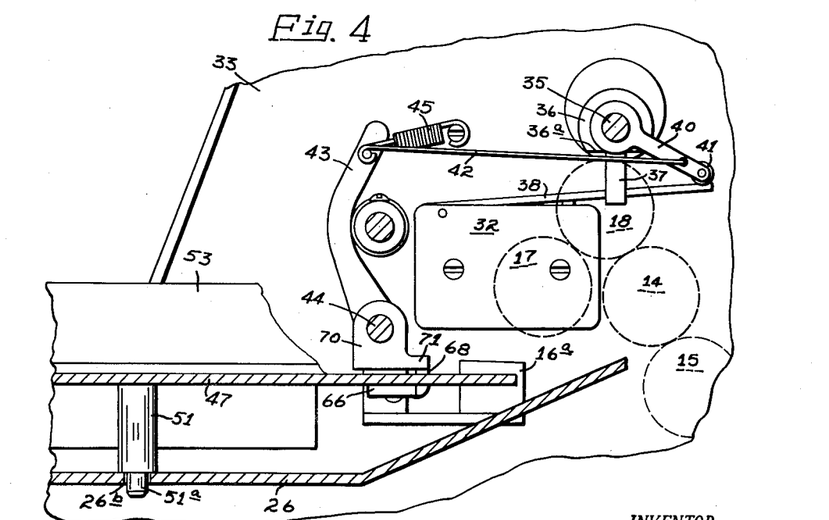
FIGURE 4 is a fragmentary sectional view taken on the line 4—4 of FIG. 2.
Figure 5:
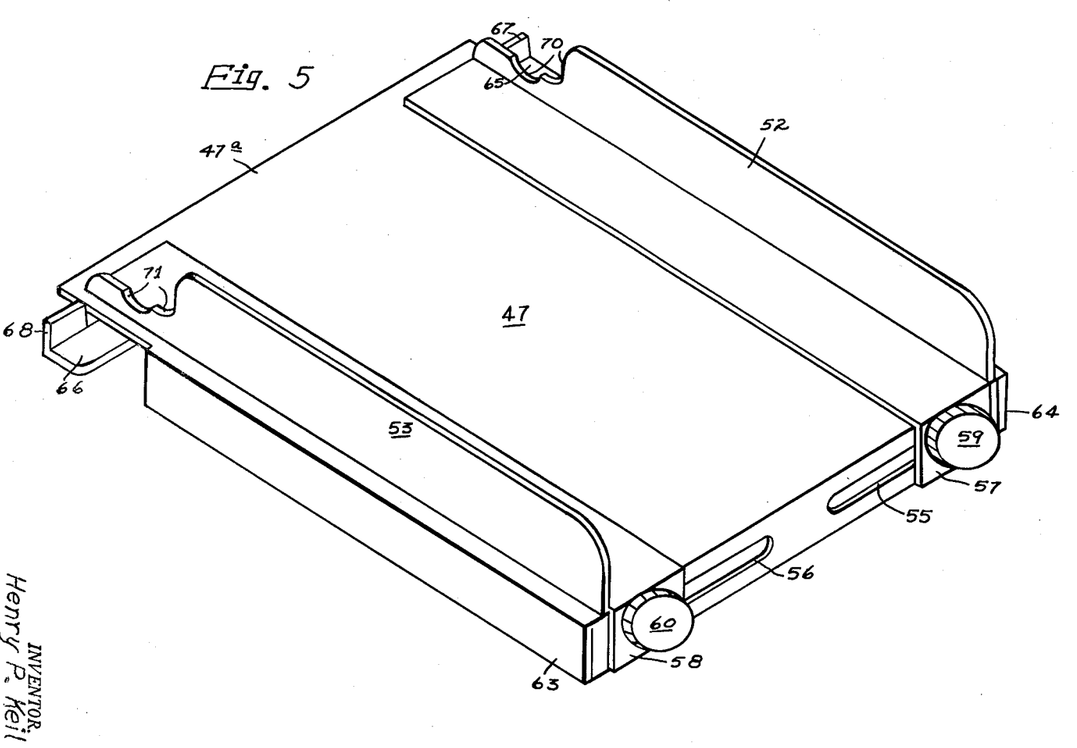
FIGURE 5 is a perspective view of the auxiliary copy sheet feed tray.
Figure 6:
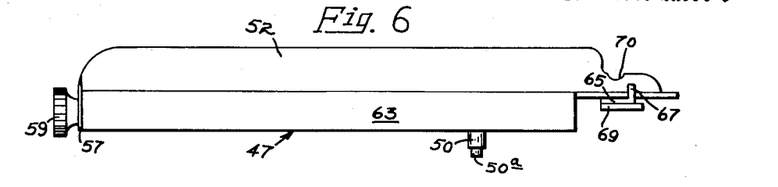
FIGURE 6 is a side view of the auxiliary copy sheet feed tray.
Figure 7:
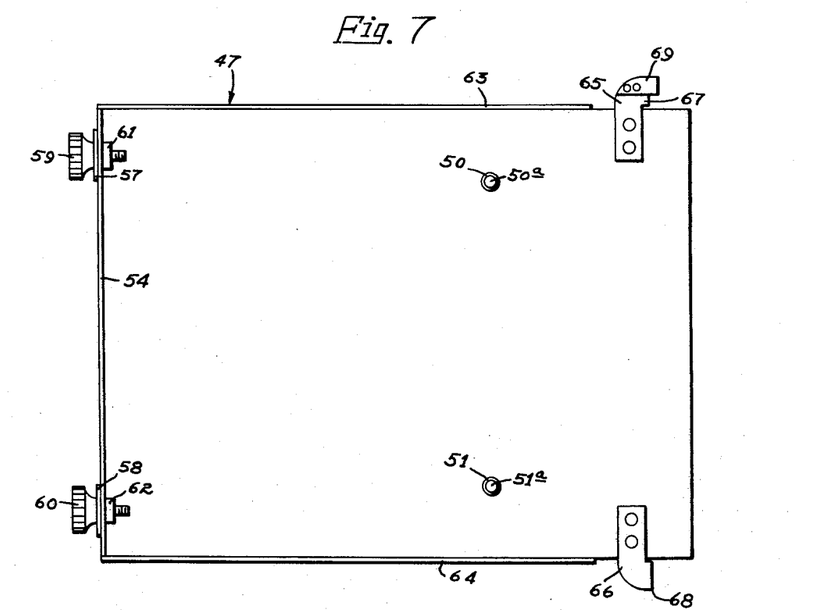
FIGURE 7 is a bottom view of the auxiliary copy sheet tray.
Figure 8:
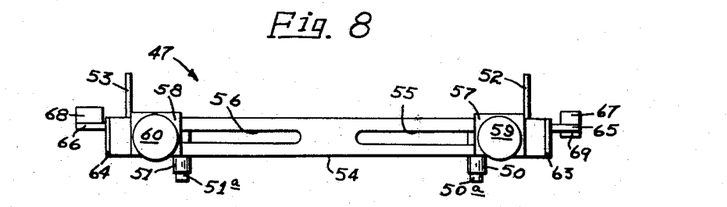
FIGURE 8 is a front end view of the copy sheet feed tray.

A link 42 connects the arm 40 to an arm 43 that is fixed to a shaft 44 which is supported by two brackets 16a and 16b that are fixed to the fountain 16. The arm 43 is biased toward the right as shown in FIGURE 4 by a spring 45. By rocking the shaft 44 counter clockwise as seen in FIGURE 4, it can be made to move the arm 42 to the left and effect closing of the switch 32. Once the switch is closed, it will cause the drum 10 to rotate until the flat portion 36a is facing down again, at which time the drum 10 will be stopped due to opening of the switch 32 unless the lever 38 is held down while the flat portion 36a moves past the projection 37.

My invention is particularly directed to the mechanism whereby the shaft 44 is controlled by a hand lever 46 and an auxiliary copy sheet feed tray 47. As shown the hand lever 46 has its shaft 48 journalled in the side frame 34 and extended through this side frame toward the other side frame 33. The shaft 48 has a latch plate 49 fixed thereto which cooperates with the tray 47 to control the energization of the switch 32 and acts to stop the drum when desired in position to change master sheets and to open the master sheet gripper means 11.

The auxiliary feed tray 47 has two posts 50 and 51 fixed thereon which are adapted to seat on the feed tray 26 with their reduced lower ends 50a and 51a seated in apertures 26a and 26b in the feed tray 26. The tray 47 has two adjustable side guides 52 and 53 mounted thereon. The tray 47 has a down turned flange 54 at its front end which is provided with two elongated slots 55 and 56. The side guides 52 and 53 are L-shaped with their horizontal portions resting on the tray 47 and these portions have down turned ends 57 and 58 extending down across the slots 55 and 56. The ends 57 and 58 are clamped to the flange 54 by knurled head screws 59 and 60 and nuts 61 and 62 which are held against turning by engaging the bottom of the tray 47. The side edges of the tray 47 are provided with side flanges as indicated at 63 and 64 to add stiffness to the tray. At the rear end of the tray 47 there are two brackets 65 and 66 which have upturned ends 67 and 68 and the bracket 65 carries a stop lug 69 that extends rearwardly beyond the upturned end 67. The side guides 52 and 53 are cut away as illustrated at 70 and 71 so that the tray 47 can be inserted beneath the shaft 44. When the auxiliary feed tray 47 is placed over the main feed tray 26, its rear end 47a, which extends beyond the side guides 52 and 53 and the brackets 65 and 66, fits between the brackets 16a and 16b on the fountain 16. The stop lug 69 engages the bracket 16b when the posts 50 and 51 are aligned with the apertures 26a and 26b.

The shaft 44 has a member 70 fixed thereon in line with the bracket 66 on the feed tray 47. This member has an offset lug 71 with which the upturned end 68 of the bracket 66 engages. The shaft 44 also has a member 72 fixed thereon in line with the bracket 65 on the feed tray 47. Offset lug 73 of the member 72 is engaged by the upturned end 67 of the bracket 65. It will be evident from the above description and FIGURES 2, 3 and 4, that if the front end of the tray 47 is pushed downward, the tray will tip about the meeting points of the posts 50—51 with the tray 26. This causes the upturned ends 67 and 68 of the brackets 65 and 66 to press the lugs 73 and 71 upwardly to rock the shaft 44 in a direction to cause the arm 43 to swing to the left, as seen in FIGURE 4, against the pull of the spring 45, enough to cause the arm 40 to swing down far enough that its roller 41 will move the switch lever 38 to switch closing position. The spring 45 is strong enough to prevent any unbalance of the weight of a pack of copy sheets from closing the switch lever 38. However, the operator can very easily apply enough pressure to the front end of the tray 47 to effect switch closing action of the lever 38. Thus the operator can hold down the front end of the tray 47 for as many copies as are wanted of the copy sheets in the tray 47. It should be understood, of course, that the sheet feeding mechanism 20—25 may be lifted up when the auxiliary feed tray 47 is inserted and then let down on the sheets in the tray 47 to feed the sheets from this tray in the same manner as it feeds them from the tray 26.

Figure 1:
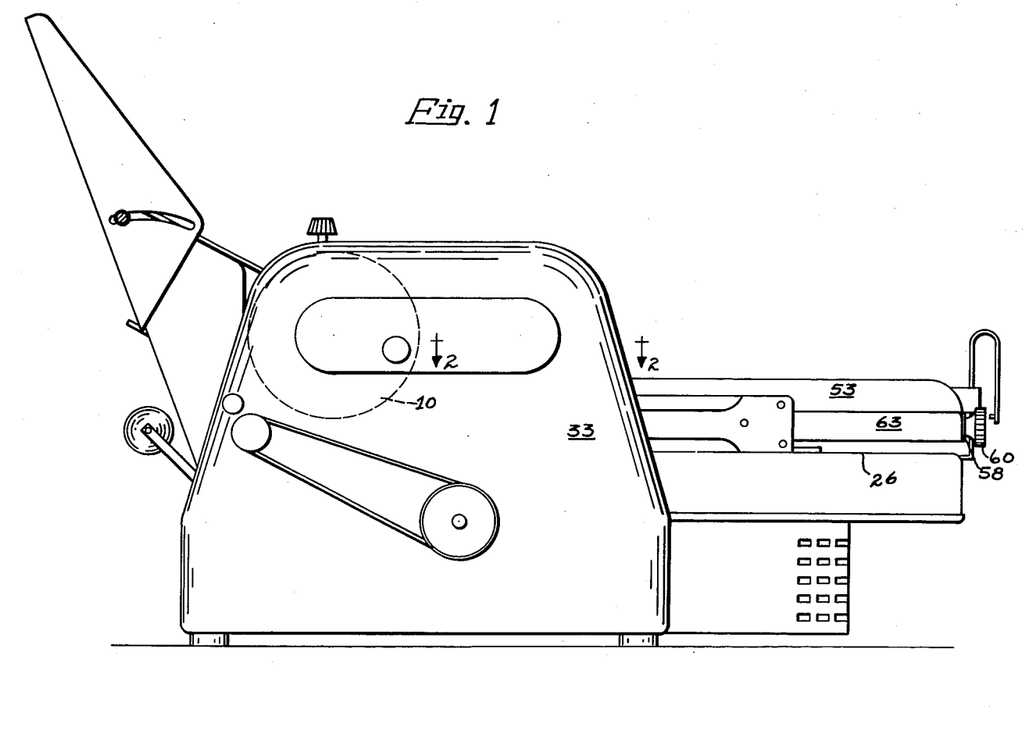
FIGURE 1 is a view in side elevation of an electrically operated duplicating machine with my invention applied thereto.
Figure 2:
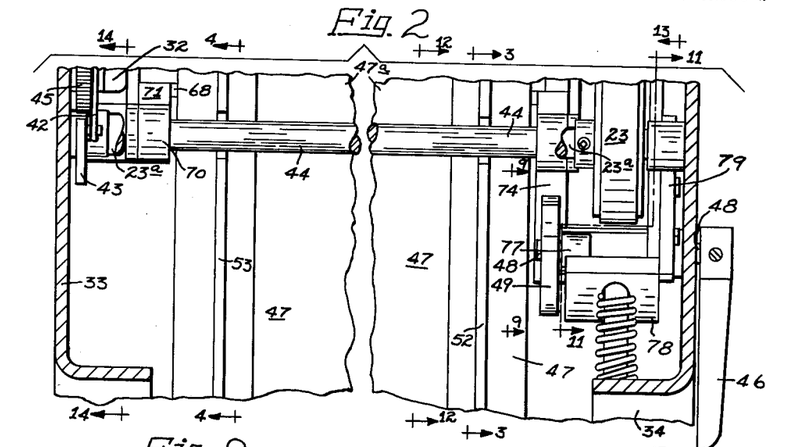
FIGURE 2 is a partial plan view taken substantially on the line 2—2 of FIG. 1.

The hand lever 46 and its latch plate 49 cooperate with a forwardly extending bar 74 on the member 72 to render the auxiliary tray operation effective or ineffective as desired by the operator. In the normal operation just described, the hand lever 46 extends horizontally forward as illustrated in FIGURE 2 and is in what I term the nine o'clock position. The plate 49 then occupies the position shown in FIGURE 3 of the drawings. It is entirely above the bar 74 and does not in any way interfere with the movement of the members 70 and 72 by tipping of the tray 47.

Figure 3:
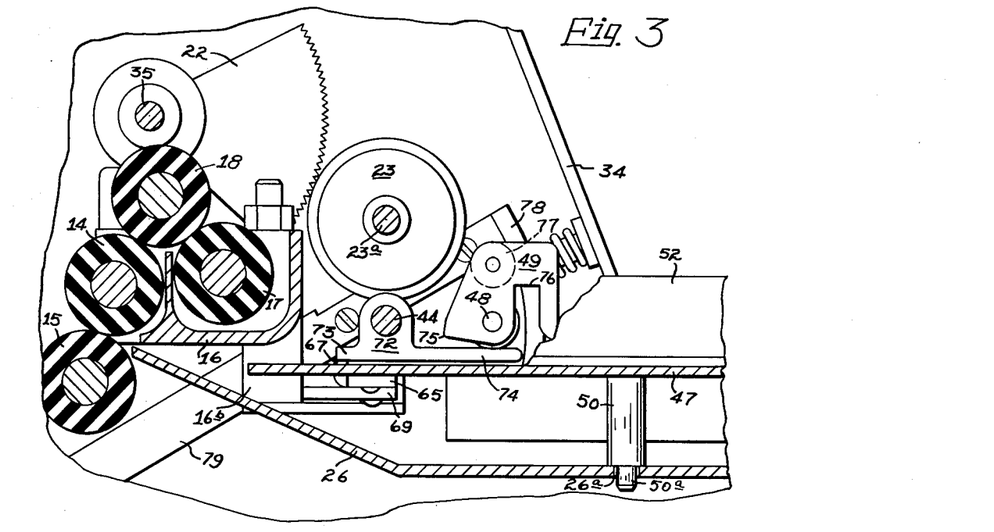
FIGURE 3 is a fragmentary sectional view taken on the line 3—3 of FIG. 2.
Figure 9:
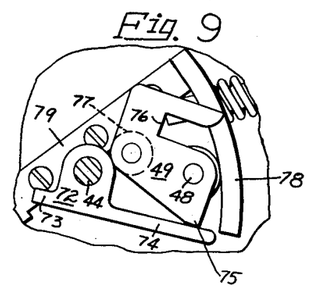
FIGURE 9 is a fragmentary sectional view taken on the line 9—9 of FIG. 2, showing the parts in a changed position from that shown in FIG. 3.

By raising the hand lever 46 upward the latch plate 49 is rotated counterclockwise from the position shown in FIGURE 3 to the position shown in FIGURE 9 when the hand lever 46 is in upright or twelve o'clock position. The latch plate in the FIGURE 9 position depresses the bar 74 by pressing the portion 75 of the latch plate 49 against it. This turns the shaft 44 enough to move the lever 38 to switch closing position. When the lever 46 is returned to nine o'clock (horizontal) position, the shaft 44 is returned by the force of the spring 45 to a position where the bar 74 is horizontal, as shown in FIGURE 3. Note that the members 70 and 72 are spaced apart far enough for the end 47a of the tray 47 to go between them and not interfere with the turning of the shaft 44.

The lever 46 is also used to effect a locking of the shaft 44 against rotation in its position where the switch lever is in raised, open switch, position. By moving the lever 46 down from nine o'clock position to six o'clock position the latch plate 49 is brought to the position shown in FIGURE 10 of the drawings. In this position the latch plate 49 has its channel 76 receiving the end of the bar 74 so that the bar 74 cannot move down far enough to cause the switch lever 38 to close its switch 32. Therefore the machine will stop when the flat part 36a of the cam 36 reaches the position shown in FIGURE 4 of the drawings.

Figure 10:
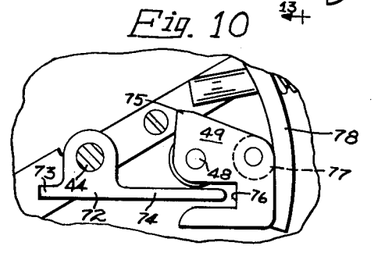
FIGURE 10 is a fragmentary sectional view on the line 9—9 of FIG. 2, showing the parts in a third position.
Figure 11:
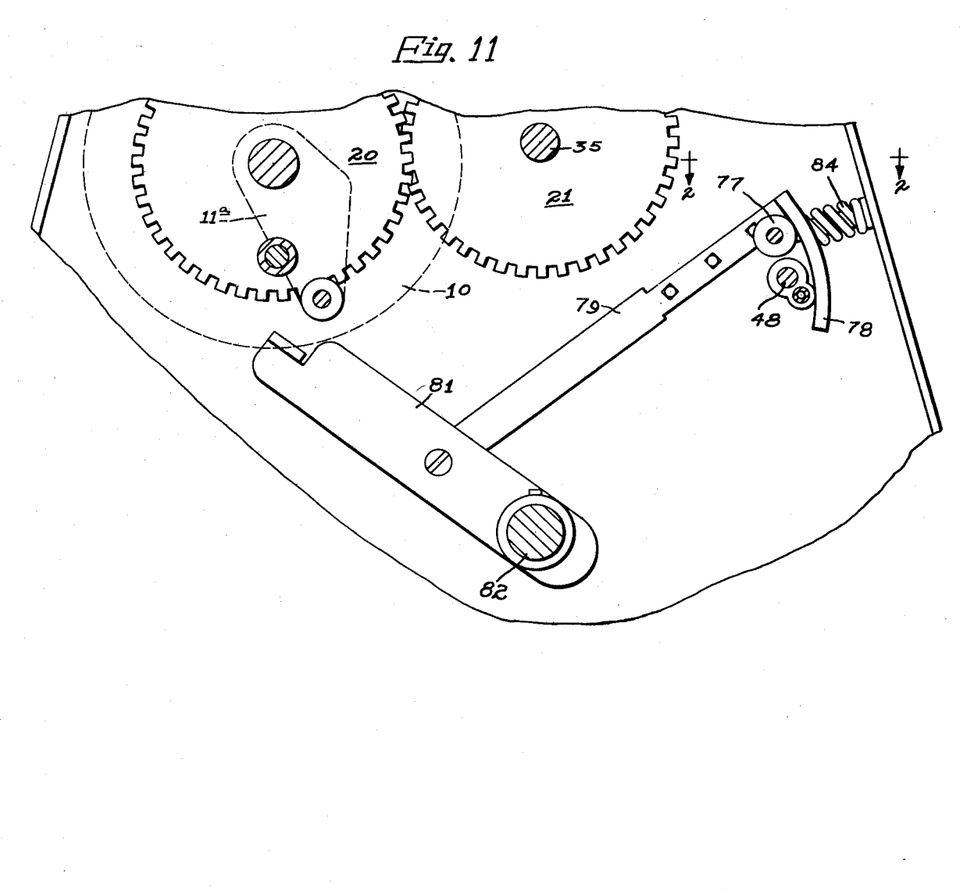
FIGURE 11 is a fragmentary sectional view on the line 11—11 of FIG. 2, showing the connection between the drum and the control mechanism.
Figure 12:
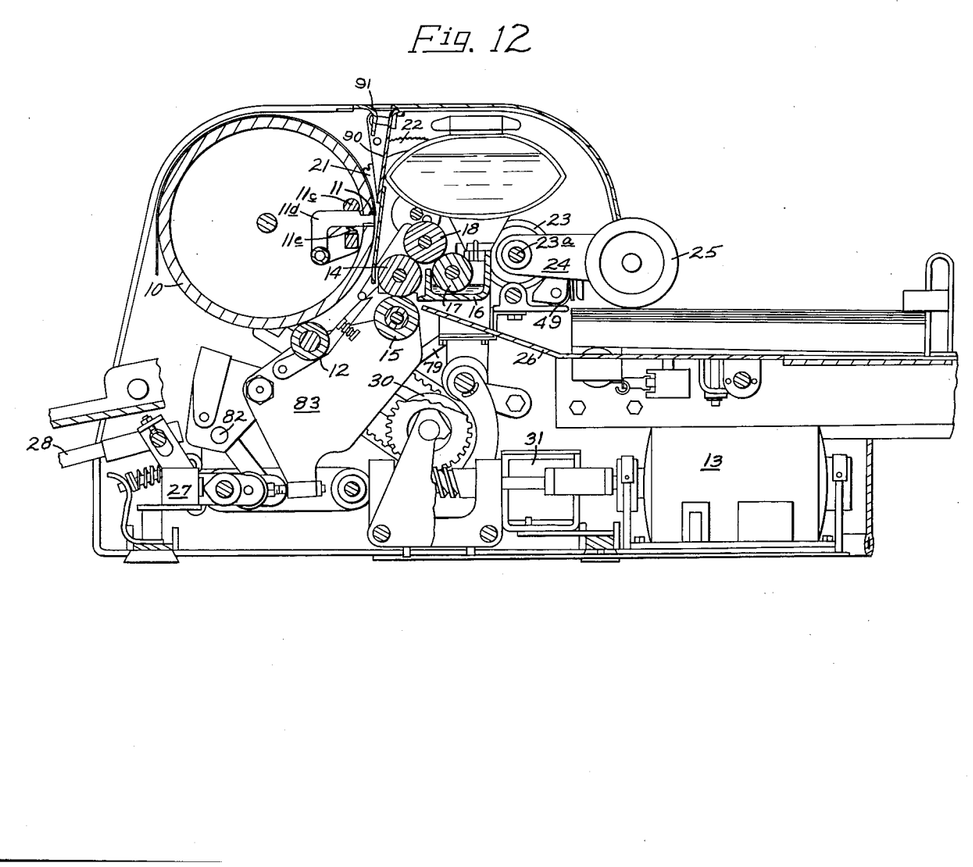
FIGURE 12 is a sectional view on a reduced scale taken through the whole machine substantially on the line 12—12 of FIG. 2.
Figure 13:
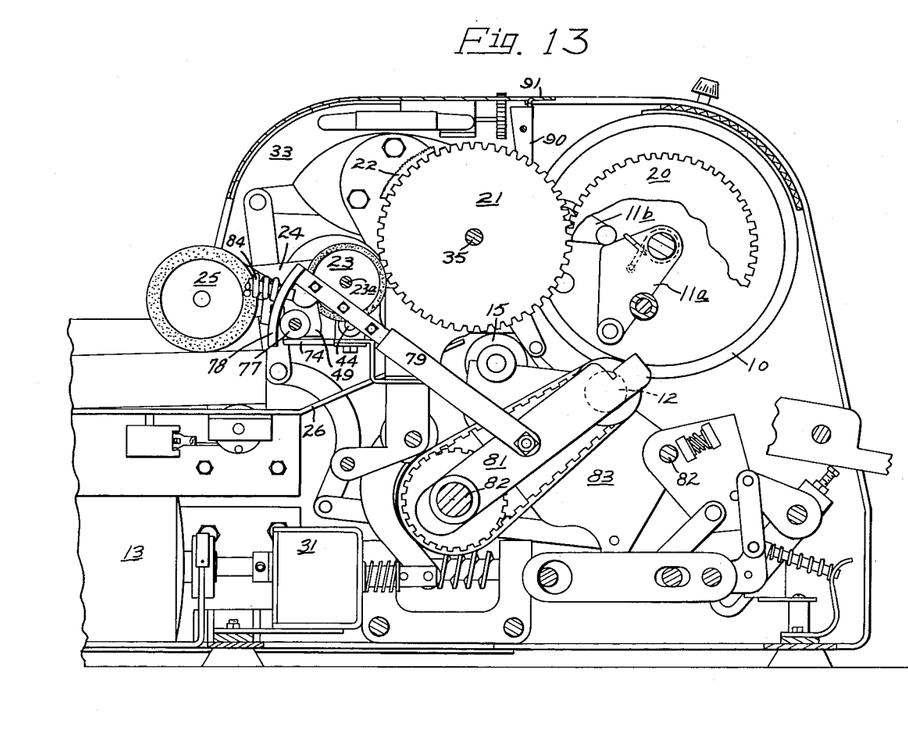
FIGURE 13 is a fragmentary sectional view on a larger scale than FIG. 12, taken on the line 13—13 of FIG. 2.
Figure 14:
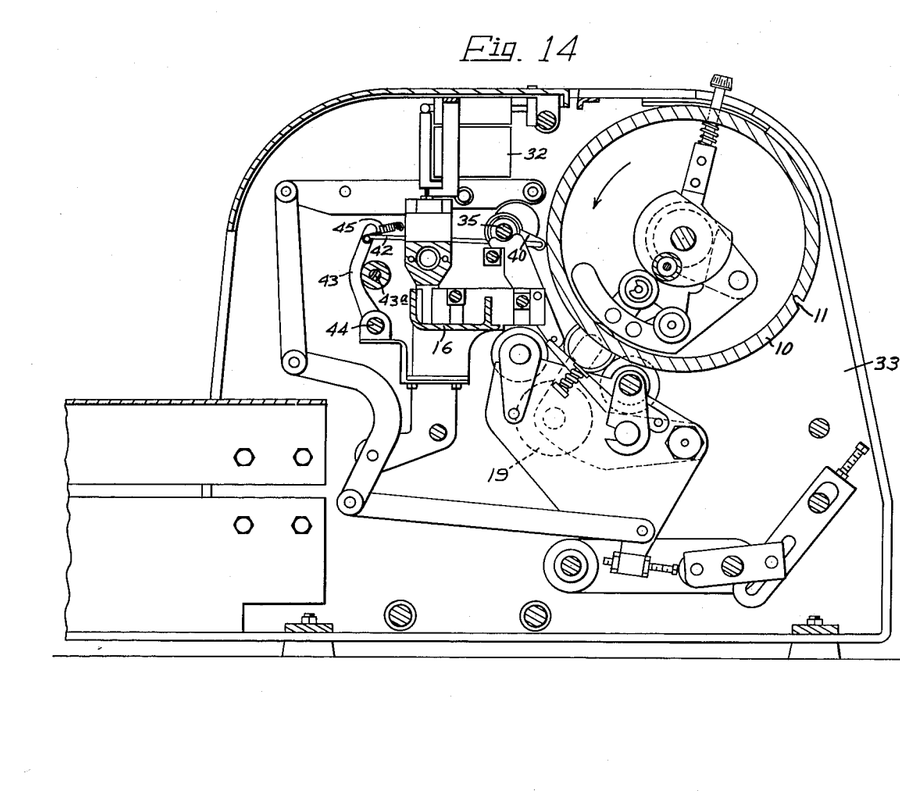
FIGURE 14 is a sectional view taken on the line 14—14 of FIG. 2 and on the same scale as FIG. 13.

When the latch plate 49 is brought to the position shown in FIGURE 10, it also actuates a mechanism to cause opening of the master sheet clamp 11 on the drum 10. This mechanism embodies a pin 77 on the plate 49 which engages an angular member 78 that is mounted on a master clamp opening bar 79. The bar 79 extends alongside the side frame 34 back to a lever arm 81 that is pivotally mounted on the boss 82 of the side frame 34. The bar 79 is spring biased rearwardly by a spring 84 so as normally to hold the lever arm 81 out of the path of the opening lever 11a for the master sheet clamp 11. When the hand lever 46 is pointed down, in six o'clock position, the pin 77 is moved against the angular member 78 on the bar 79 and moves the lever arm 81 up and forward against the clamp opening lever 11a on the drum 10 while the drum is stopped in home position. This moves the lever 11a backwards with respect to the direction of rotation of the drum 10 and causes it to push a lever 11b of the master clamp mechanism in a direction to turn the flattened shaft 11c and cause it to move the master clamp fingers 11d out against their springs 11e and thus release the master sheet.

The machine is provided with a two part guard and guide member 90 that extends down in front of the drum 10 and protects the master sheet from the moistening mechanism. This member 90 also serves to guide a master sheet into the open master sheet clamp slot at 11 when the clamping fingers 11d are moved out. The master sheet is inserted directly down from the top of the machine between the member 90 and an angular guide 91 that extends across the machine and is spaced from the member 90 to provide a master sheet slot.

The return of the hand lever 46 to nine o'clock, or horizontal position, frees the bar 79 as it is moved rearwardly by the spring 84 and the clamp fingers can then close against an inserted master under the force of their springs 11e. Return of the lever 46 to horizontal position also turns the latch plate 49 from the position shown in FIGURE 10 to that shown in FIGURE 3, so that the machine is ready to operate any time the shaft 44 is turned, either by the auxiliary tray 47 or by the raising of the hand lever 46 to upright (twelve o'clock) position to effect closing of the switch 32.

It is believed to be evident from the foregoing description that I have provided a new and simple mechanism whereby the duplicating machine can be made to take copy sheets from the auxiliary tray 47, one at a time at the will of the operator, and master sheets can be released and clamped by the simple action of the hand lever 46. This modification of the power driven machine shown in my prior application, Ser. No. 20,931 greatly enhances the utility of the machine for so-called "system" uses where it is often desirable to make a variety of different copies by use of master sheets and various block-out sheets or blocked out copy sheets. It retains all of the advantages of continuous operation whenever long runs of copies are needed.

Having described my invention, I claim:

1. In a duplicating machine including a rotatable drum having means to clamp a master sheet thereon and a platen roller engaging the drum, an including copy sheet feeding and moistening means operable intermittently to feed copy sheets to the bight between the platen roller and the drum, motor means in the machine operatively connectible to the platen roller and drum operable to cause them to rotate and press copy sheets fed therebetween against the master sheet on the drum, the improvement comprising a copy sheet feed tray movably positioned on said machine in front of the sheet feeding and moistening means from which sheets may be advanced to the sheet feeding and moistening means, control means including a clutch mechanism for drivingly connecting the motor means to the drum and platen roller, and means operable by movement of the copy sheet feed tray to actuate said clutch mechanism.

2. In a duplicating machine having a rotatable drum provided with a master sheet clamp, a yieldable platen roller positioned to press copy sheets against a master sheet clamped to the drum, a copy sheet moistening and feeding means operable to moisten and feed copy sheets between the drum and the platen roller, a copy sheet tray positioned to hold a supply of copy sheets in front of the sheet moistening and feeding means and an intermittently operating copy sheet feeder over said tray and drivingly connected to the drum to advance copy sheets from said tray to the moistening means, the improvement comprising an auxiliary copy sheet feed tray, means movably seating said auxiliary tray over the first named tray in position to hold copy sheets beneath said feeder, power means for driving said platen roller and drum, control means for connecting and disconnecting the power means to the drum and platen roller and means connecting the control means and the auxiliary tray operable by movement of said auxiliary tray to cause the control means to connect the power means to the drum and platen roller.

3. The invention defined in claim 2 wherein the control means comprises a normally open switch positioned adjacent to one end of the drum and having a switch lever operable to close the switch, cam means driven in unison with the drum engaging the switch lever for maintaining it in switch closing position while the drum completes a revolution, a rock shaft connected to the switch lever to move it to switch closing position and means on the auxiliary tray operable by movement of the tray to rock said shaft.

4. The invention defined in claim 2 wherein the control means comprises a normally open switch positioned adjacent to one end of the drum and having a switch lever operable to close the switch, cam means driven in unison with the drum engaging the switch lever for maintaining it in switch closing position while the drum completes a revolution, a rock shaft connected to the switch lever to move it to switch closing position, means on the auxiliary tray engaging the rock shaft and operable by movement of the tray to rock said shaft, a hand lever pivoted on the machine and means on the hand lever connected to the rock shaft for locking the rock shaft against movement by the tray.

5. In a duplicating machine having a rotatable drum provided with a master sheet clamp, a yieldable platen roller positioned to press copy sheets against a master sheet clamped to the drum, a copy sheet moistening and feeding means operable to moisten and feed copy sheets between the drum and the platen roller, a copy sheet tray positioned to hold a supply of copy sheets in front of the sheet moistening and feeding means and an intermittently operating copy sheet feeder over said tray and drivingly connected to the drum to advance copy sheets from said tray to the moistening means, a motor and clutch and brake means operable to connect and disconnect the motor and the drum for rotating the drum, rock shaft means operable to actuate said clutch and brake means, an auxiliary feed tray having posts removably seated in said copy sheet feed tray and having means engaging the rock shaft means to rock the shaft by tilting movement of the auxiliary feed tray.

6. The invention defined in claim 5 together with manually operable latch means engageable with said rock shaft means to lock it against movement by said auxiliary feed tray, said latch means having means to rock the shaft for actuating said clutch and brake means.

7. In a duplicating machine having a rotatable drum provided with a master sheet clamp, a yieldable platen roller positioned to press copy sheets against a master sheet clamped to the drum, a copy sheet moistening and feeding means operable to moisten and feed copy sheets between the drum and the platen roller, a copy sheet tray positioned to hold a supply of copy sheets in front of the sheet moistening and feeding means and an intermittently operating copy sheet feeder over said tray and drivingly connected to the drum to advance copy sheets from said tray to the moistening means, a motor and clutch and brake means operable to connect and disconnect the motor and the drum for rotating the drum, rock shaft means operable to actuate said clutch and brake means, an auxiliary feed tray having posts removably seated in said copy sheet feed tray and having means engaging the rock shaft means to rock the shaft by tilting movement of the auxiliary feed tray, a manually operable latch means positioned adjacent said rock shaft means and engageable therewith to lock it against movement, and lever and link means connected to the latch means and extending alongside of one end of the drum, said drum having thereon at said end a master sheet clamp opening lever engageable by said lever and link means to open the master sheet clamp upon movement of the latch means into rock shaft locking position.

No references cited.